P. C. WILLIAMSON.
VARIABLE SPEED GEAR.
APPLICATION FILED MAY 19, 1908.
923,472.
Patented June 1, 1909.
2 SHEETS—SHEET 1.
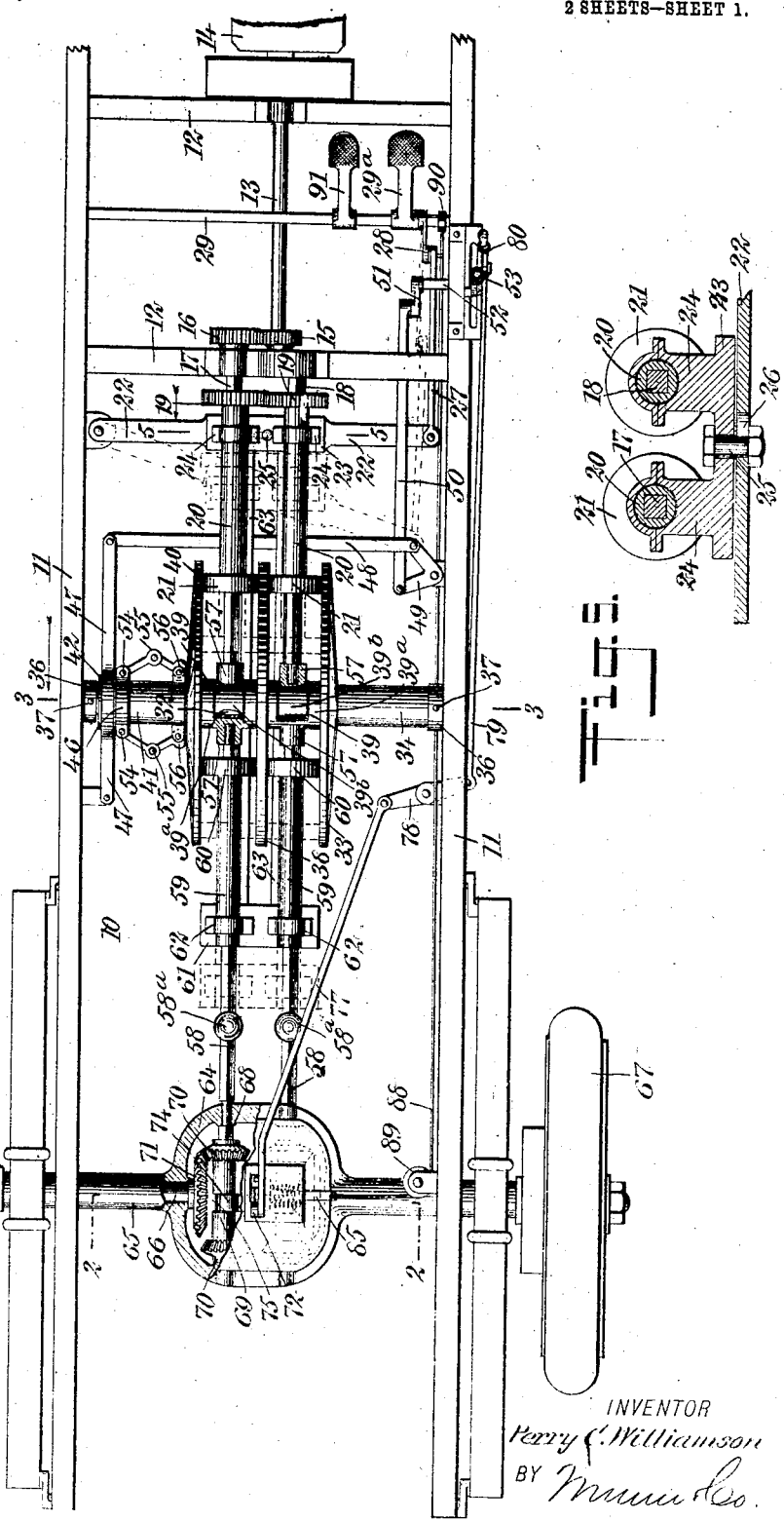
WITNESSES
INVENTOR
Perry C. Williamson
BY
ATTORNEYS

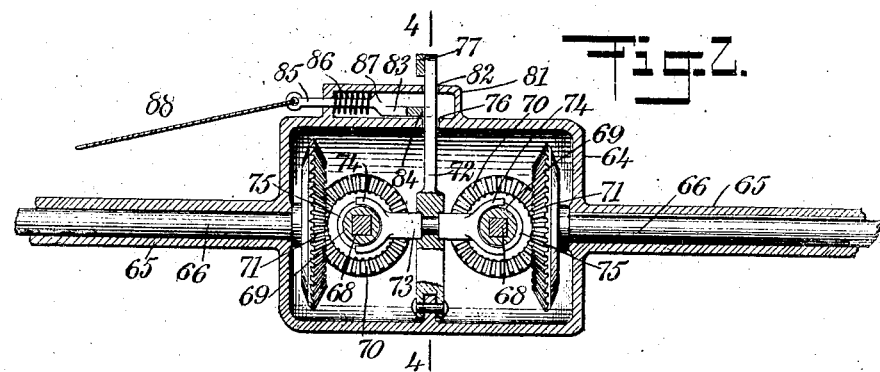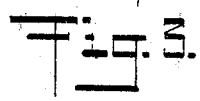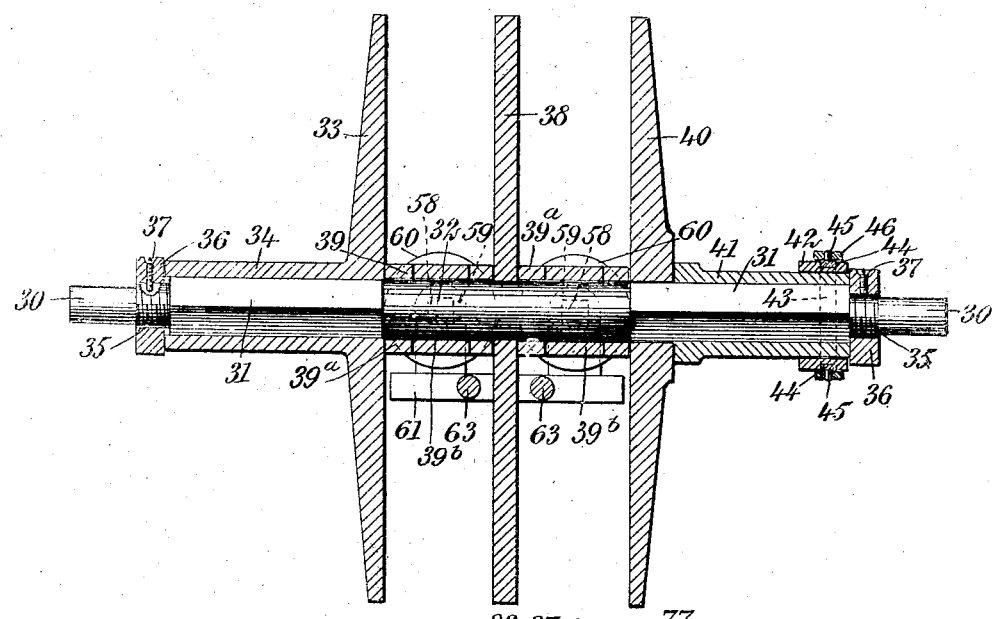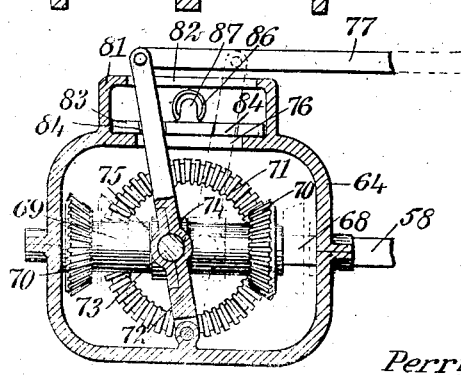

UNITED STATES PATENT OFFICE.

PERRY C. WILLIAMSON, OF OAKLAND, CALIFORNIA.

VARIABLE-SPEED GEAR.

No. 923,472.   Specification of Letters Patent.   Patented June 1, 1909.

Application filed May 16, 1908. Serial No. 433,681.

*To all whom it may concern:*

Be it known that I, PERRY C. WILLIAMSON, a citizen of the United States, and a resident of Oakland, in the county of Alameda and State of California, have invented a new and Improved Variable-Speed Gear, of which the following is a full, clear, and exact description.

This invention relates to variable speed gears, and is particularly useful in connection with motor-driven vehicles and the like.

More specifically, the invention relates to a variable speed gear for operatively connecting the motor and the driving wheels of an automobile, or the propeller of a motor-boat or the like, and comprises friction disks, driving and driven rollers movably engaging the disks and simultaneously operable so that the change in the speed of rotation of the driven rollers is a multiple of the change of speed of the driven disks, and in which the disks are operable to release the rollers.

An object of the invention is to provide a simple, strong and efficient variable speed gear, for use in connection with motor-driven vehicles and the like, which is comparatively inexpensive to manufacture, which can be operated with ease and precision to vary the speed or to reverse the driven parts, and which, when applied to a motor-driven vehicle obviates the necessity of a differential gear.

A further object of the invention is to provide a device of the class described, for transmitting power from a motor to a driven object, by means of friction disks and rollers, which permits the speed to be varied between wide limits by comparatively small changes in position of the parts, and which to a large extent obviates strain on the bearings of the shafts carrying the contact friction members.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is a plan view of an automobile chassis having my invention applied thereto; Fig. 2 is an enlarged transverse section on the line 2—2 of Fig. 1; Fig. 3 is an enlarged transverse section on the line 3—3 of Fig. 1; Fig. 4 is a longitudinal section on the line 4—4 of Fig. 2; and Fig. 5 is a transverse section on the line 5—5 of Fig. 1.

Before proceeding to a more detailed explanation of my invention, it should be clearly understood that one of the main objects of the same is to obviate the strain upon the bearings of the shafts carrying the friction disks. In variable speed friction gearing of the usual type, there is considerable strain upon the bearings which tends to shorten the life of the mechanism and causes considerable losses in power. The arrangement of the parts of my invention does away with this strain to a large extent owing to the provision of three friction disks, between each adjacent two of which the driven and driving friction rollers are arranged, so that the strain due to the contact pressure between the disks of the rollers is taken up by the disks themselves. The driving rollers and the driven rollers of my gear are simultaneously operable in different directions with respect to the friction disks, so that as the driving rollers are moved to increase the speed of the disks the driven rollers are correspondingly moved too, and thus the rate of speed change is practically doubled. For example, as a driving roller is moved from the periphery toward the center of a disk, the speed of the driving roller remaining constant, the speed of the disk driven thereby increases; at the same time the driven roller actuated by the disk is moving from the center toward the periphery of the disk and its speed is therefore correspondingly increased. It will be easily seen that by this arrangement the speed changes are rendered more rapid, and a wider limit of change is offered than when one of the rollers, that is, either the driving or the driven roller alone, is movable transversely of the disk.

I provide a driving axle in two sections, each of which has a bevel gear adapted to be engaged by one of two bevel gears controlled by one of the driven rollers. By shifting the shaft carrying the two bevel gears, the direction of rotation of each axle section can be easily reversed, while this construction obviates the necessity of a differential gear.

Referring more particularly to the drawings, 10 represents a motor vehicle chassis of any preferred or common form, having longitudinal frame members 11 and cross frame members 12 upon which is journaled the engine shaft 13 driven by the motor 14. The shaft 13 has a spur gear 15 in mesh with a second spur gear 16 carried upon a shaft 17 of angular cross section. A second similar shaft 18 is operatively connected therewith by means of gears 19. The shafts 17 and 18 are suitably journaled upon one of the cross frame members 12. Each of the shafts 17 and 18 has a suitably formed sleeve 20, slidably mounted thereon and constrained to rotate therewith, and having at the end a driving friction roller 21.

A bar 22 is pivotally mounted upon one of the longitudinal frame members 11, and carries a plate 23 having bearings 24 in which are journaled the sleeves 20 upon the shafts 17 and 18. The plate 23 has an opening in which is arranged a bolt 25 extending through a slot 26 of the bar 22, so that the plate 23 can move slidably upon the bar when the latter is swung from one position to another, as is indicated in dotted outline in Fig. 1. A link 27 connects the free end of the bar 22 with an arm 28 rigid with a pedal 29ª loosely mounted upon a pedal shaft 30. Thus the driver of the motor vehicle can control the sleeves 20 by means of the pedal 29ª, to shift the driving rollers 21 backward or forward, for a purpose which will appear more clearly hereinafter. A cross shaft 30 has the ends journaled in suitable bearings of the longitudinal frame members 11, and adjacent to the latter has portions 31 of angular section, between which is a portion 32 of circular section. A friction disk 33 having a sleeve 34, and suitably formed for the purpose, is mounted upon one of the portions 31, whereby the shaft 30 is constrained to rotate with the disk 33. Adjacent to the frame members 11, the shaft 30 has threaded portions 35 upon which are arranged adjusting nuts 36 adapted to be locked in position by means of set screws 37. A friction disk 38 is loosely mounted upon the portion 32 of the shaft 30 and is separated from the disk 33 by means of a sleeve 39 within which the portion 32 is free to rotate and which sleeve comprises independently movable sections 39ª and 39ᵇ, the former being substantially U-shaped. A further friction disk 40 having an opening of angular section is suitably mounted upon the other of the portions 31 and is separated from the disk 38 by a second sectional sleeve 39 within which the portion 32 is free to rotate. A sleeve 41 of angular section is mounted upon the portion 31 of the shaft 30 adjacent to the disk 40, and is constrained to rotate with the shaft. A collar 42 is loosely mounted upon the sleeve 41 and has an annular groove 43 in which are arranged slidable blocks 44 having pins 45 pivotally located in openings of a ring 46 encompassing the collar 42 and having rigid extensions 47, forming a lever controlling the ring. The lever is pivoted at one end upon one of the frame members 11 and is connected by means of a link 48 with a bell crank lever 49 pivoted upon the opposite member 11 and joined by means of a link 50, an arm 51 and a pintle 52 with a hand lever 53, by means of which the collar 42 can be manually controlled. The collar has ears 54 carrying pivoted toggles 55, the opposite ends of which are pivotally mounted at the end of the sleeve 41 adjacent to the disk 40, and have extensions 56, adapted to engage the disk 40. By swinging the lever 47 toward the disk 40 the collar 42 is actuated to shorten the toggles 55, whereby the extensions 56 are forced against the disk 40 and thus tend to force the latter toward the disks 33 and 38. As the driving rollers 21 are arranged between the disk 33 and the disk 38, and the disk 38 and the disk 40 respectively, this movement of the collar serves to engage the disks and the rollers firmly. By means of the bar 22 the rollers 21 can be moved radially of the disks to vary the speed with which the latter are driven.

The sleeves 39, at the opposite sides, have bearings 57 in certain of which are journaled the ends of the shafts 17 and 18 which are suitably formed for the purpose. Shafts 58, substantially parallel, and of angular section, have suitably formed ends journaled in the bearings 57 at the rear of the sleeves 39, and have slidably mounted thereon suitably formed sleeves 59 carrying rigid driven rollers 60, each located between the disks of an adjacent pair. A movable plate 61 has bearings 62 in which the sleeves 59 are journaled and is rigidly connected by means of rods 63 with the plate 23, so that the sleeves 59 and the rollers 60 are constrained to move simultaneously with the sleeves 20 and the rollers 21. It will be understood that as the rollers 21 are moved in one direction with respect to the disks the rollers 60 are moved in an opposite direction and thereby the changes in speed are effected with greater rapidity and with smaller adjustments than in the ordinary friction gears of this type.

At the rear end of the chassis is located a gear casing 64 having axle sleeves 65 at opposite sides, in each of which is arranged a section 66 of a driving axle carrying one of the driving wheels 67. The shafts 58 are journaled in bearings formed in the sides of the casing 64 and within the latter have portions 68 of angular section upon which are mounted sleeves 69, each having two bevel gears 70 adapted to mesh with a bevel gear 71 carried by the adjacent axle section 66. The arrangement is such that one only, of the bevel gears 70 can mesh at a time with the bevel gear 71. A lever 72 is pivoted within the casing and has a cross bar 73, the ends 74 of which are bifurcated and slidably engage grooves 75 of the sleeves 69 to control the sleeves. The lever 72 extends through a slot 76 of the casing and is connected by means of a link 77 with a lever 78 pivoted upon one of the frame members 11 and in turn connected by means of a link 79 with a hand lever 80 by means of which it can be controlled. Upon the casing 64 is a housing 81 into which the lever 72 extends and the top of which is provided with a slot 82 movably to receive the end of the lever 72. Within the housing 81 is a slidable plate 83 having notches 84 adapted to engage the lever 72. The plate 83 has a stem 85 upon which is a helical spring 86 engaging at a side of the housing and at a lug 87 of the stem, which forces the plate normally toward the lever 72. The arrangement is such that when the lever 72 is engaged by one of the notches 84, one of the gears 70 of each of the sleeves 69 engages the corresponding gear 71, and when the other of the notches 84 engages the lever 72 the other of the gears 70 of each of the sleeves 69 engages the corresponding gear 71. That is, according to the position of the lever 72 the axle sections 66 and the driving wheels 67 are driven in one direction or the other by means of the shafts 58. The stem 85 is connected by means of a flexible member 88 passing over a suitable pulley 89 with an arm 90 rigid with the shaft 29. The latter has a rigid pedal 91 by means of which it can be controlled to actuate the stem 85.

By providing the disk 33 which cannot move longitudinally of the shaft 30, and the movable disk 40 which can be adjusted, the strain due to the frictional contact between the disks and the rollers, is directed longitudinally of the shaft and does not affect the bearing to any appreciable extent. Furthermore, the strain does not tend to distort the friction disks nor is it unequally applied thereto to an extent which would render them liable to excessive wear. The sectional form of the sleeves 39 permits the frame of the vehicle to distort owing to inequalities of the road or for other reasons, without injuring or straining the mechanism. To add further flexibility to the construction each of the shafts 58 has a universal joint 58ª.

Having thus described my invention I claim as new, and desire to secure by Letters Patent:

1. In a variable speed gear, a shaft, a plurality of friction disks upon said shaft, further shafts, and driving and driven rollers arranged between said disks on said further shafts respectively, said first shaft extending between said disks, said further shafts extending between said disks at angles with said first shaft and intersecting the same.

2. In a variable speed gear, a shaft, a plurality of friction disks upon said shaft, further shafts, and driving and driven rollers arranged between said disks on said further shafts respectively, said further shafts being movably supported by said first shaft, each of said driven rollers being alined with one of said driving rollers.

3. In a variable speed gear, a shaft, a plurality of friction disks spaced and mounted thereon, a plurality of driving rollers each positioned between two adjacent disks, a plurality of driven rollers each positioned between two adjacent disks, and means for movably carrying said rollers, said means being supported by said shaft.

4. In a variable speed gear, a friction disk, means for movably supporting the same, a driving roller and a driven roller adapted movably to engage said disk, means for simultaneously controlling said rollers whereby the change in the speed of rotation of one is a multiple of the change in the speed of rotation of said disk, and means for movably carrying said rollers, said last-mentioned means being supported by said first-mentioned means.

5. In a variable speed gear, a disk, a driving roller and a driven roller adapted movably to engage said disk, means simultaneously controlling said rollers whereby as one is moved toward the periphery of said disk the other is moved away from the periphery, a shaft for said disk, and further shafts for said rollers, said first shaft movably supporting said further shafts.

6. In a variable speed gear, a disk, a driving roller movable radially with respect to said disk and controlling the same, a driven roller movable radially with respect to said disk and controlled thereby, means for simultaneously operating said rollers whereby the same can be simultaneously moved in opposite directions with respect to said disk, means for operating said disk to release said rollers, a shaft for said disks, further shafts for said rollers respectively, and means for supporting said further shafts on said first shaft.

7. In a variable speed gear, driving shafts, rollers thereon, means for driving said shafts in opposite directions, a friction disk between said rollers, further friction disks at the outside of said rollers, driven shafts, rollers on said driven shafts and each arranged between said first disk and one of said further disks, means for simultaneously controlling said driving rollers and said driven rollers, and common means for movably supporting said disks and said shafts.

8. In a variable speed gear, driving shafts, rollers movable longitudinally thereof, means for driving said shafts in opposite directions, a friction disk between said rollers, further friction disks at the outside of said rollers, driven shafts, rollers movable longitudinally of said driven shafts and each arranged between said first disk and one of said further disks, means for simultaneously moving said driving rollers and said driven rollers in opposite directions, means for operating one of said further disks to control the engagement between said rollers and said disks, and a shaft for said disks, said last mentioned shaft serving as a support for said other shafts.

9. In a variable speed gear, a cross shaft, friction disks rigid therewith, a further friction disk loose upon said shaft intermediate said first disks, driving rollers each arranged between said further disk and one of said first disks, driven rollers each between said further disk and one of said first disks, means for controlling said rollers, means for operating one of said further disks to move the same longitudinally of said cross shaft and shafts for movably carrying said rollers, said shafts intersecting said first shafts.

10. In a variable speed gear, a cross shaft, friction disks constrained to rotate therewith, a further disk intermediate said first disks and free to rotate upon said shaft, driving shafts arranged to rotate in opposite directions, sleeves loosely carried by said cross shaft and having bearings to receive the ends of said driving shafts, sleeves slidable upon said driving shafts and constrained to rotate therewith, driving rollers rigid with said sleeves and each arranged between said further disk and one of said first disks, driven shafts, said sleeves of said cross shaft having bearings to receive the ends of said driven shafts, sleeves slidable upon said driven shafts and constrained to rotate therewith, driven rollers rigid with said sleeves of said driven shafts and each arranged between said further disk and one of said first disks, means for simultaneously controlling said sleeves of said driving shafts and said driven shafts, and means for operating one of said first disks to control the engagement of said rollers and said disks.

In testimony whereof I have signed my name to this specification in the presence of two subscribing witnesses.

PERRY C. WILLIAMSON.

Witnesses:
TRISTRAM FAUNTLEROY DAINGERFIELD,
FRANK B. HOUGH.